D. C. KELLEM,
Assignor of one-half to N. J. WATERMAN.
Damper Regulator for Furnaces.
No. 9,590. Reissued March 1, 1881.
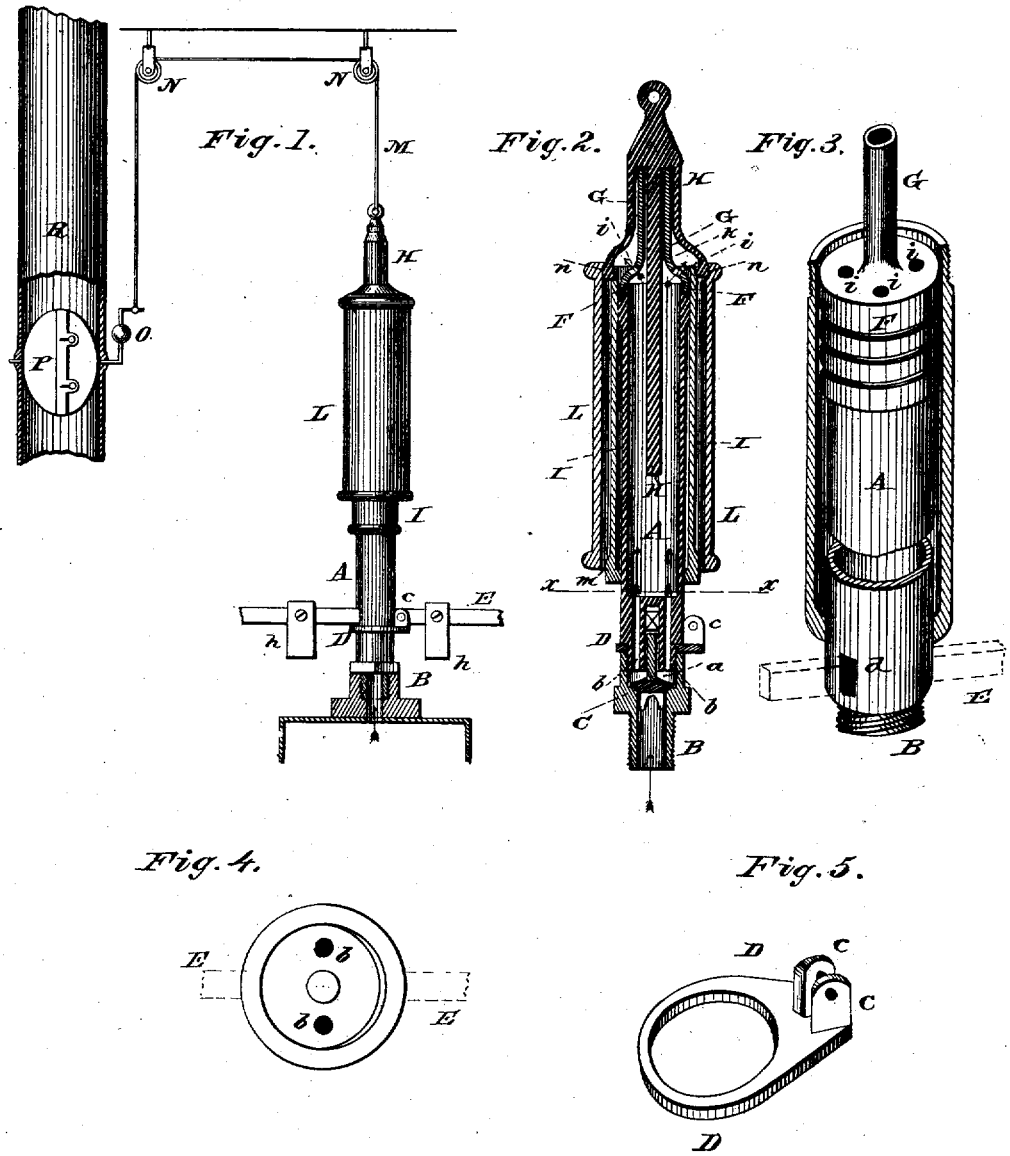
Witnesses:
P. C. Dieterich
A. M. Bright.
Inventor
W. C. Kellem.
Per W. W. Leggett. Attorney
N. PETERS, PHOTO-LITHOGRAPHER, WASHINGTON, D. C.

UNITED STATES PATENT OFFICE.

DANIEL C. KELLEM, OF DETROIT, MICHIGAN, ASSIGNOR OF ONE-HALF TO NOBLE J. WATERMAN, OF SAME PLACE.

DAMPER-REGULATOR FOR FURNACES.

SPECIFICATION forming part of Reissued Letters Patent No. 9,590, dated March 1, 1881.

Original No. 214,507, dated April 22, 1879. Application for reissue filed March 3, 1880.

*To all whom it may concern:*

Be it known that I, DANIEL C. KELLEM, of Detroit, county of Wayne, State of Michigan, have invented an Improvement in Damper-Regulators for Furnaces, of which the following is the specification.

The nature of my invention relates to certain new and useful improvements in the construction of devices for regulating the dampers of boiler-furnaces by means of the steam-pressure in the boilers, and is more especially designed to be an improvement upon a device for a similar purpose patented to me May 1, 1877, No. 190,336.

In the drawings, Figure 1 is an elevation, showing my device as applied to the damper-valve in a smoke-stack. Fig. 2 is a vertical central section. Fig. 3 is a sectional perspective of the hollow piston and cylinder. Fig. 4 is a cross-section on the line *x x* in Fig. 2. Fig. 5 is a detached perspective view of the ring to which are attached the ears which form the fulcrum of the lever.

In the drawings which form a part of this specification, A represents the hollow cylindrical piston, terminating at its lower end in a threaded pipe, B, by means of which the device is screwed into the dome, safety-valve, or steam-space of a steam-generator. This pipe B affords communication between the interior of the boiler and the chamber *a* in the bottom or lower end of the steam-cylinder piston A. Above the chamber *a* this piston is solid for a short distance, as shown in Fig. 2, except the small ports *b*, which allow the steam to pass from the chamber *a* into the hollow piston proper. This construction of the ports *b* in the body of the device, as shown, affords a straight passage for the steam from the valve to the damper-actuating mechanism. The external contour of the device is thereby simplified, the construction cheapened, and the steam led directly to its work without necessitating a change in its direction.

A valve, C, is seated in the chamber *a*, to cut off or admit a flow of steam through the pipe B, the stem of said valve having a vertical throw or play in a correspondingly-shaped hole drilled into the solid part of the piston between the ports *b*. Sleeved on said solid part of the hollow piston is a ring, D, to which are secured the ears *c*, in which is fulcrumed the lever E, which passes through the slot *d* above the end of the valve-stem. Adjustably secured upon this lever are the weights *h*. To the upper end of this hollow piston there is secured the cap F, terminating in the tube G. The cap is provided with a number of small ports or openings, *i*, which allow the steam to pass into the chamber *k*, which is formed by the cap H, which screws onto the top of the cylinder I, which incloses said hollow piston. The said piston and cylinders being so arranged as to be steam-tight, except through the ports hereinbefore mentioned.

From the top of the cap I there is suspended a guide-rod, K, which passes down through the tube-extension G of the cap F. By arranging the guide-rod to extend downwardly into the hollow piston, the outer cylinder is guided throughout its movement, and the device is thereby made of less height than is the case when the guide-rod extends above the cylinder, thus allowing the regulator to be located and operated within more contracted quarters. Again, this arrangement of parts enables separate and detached guides to be dispensed with and a more direct attachment to be made with the cylinder.

L is an outer cylinder inclosing the cylinder I, and sufficiently large to leave a dead-air space between the two cylinders, for the purpose of preventing a too rapid condensation of steam, as would be the case if the cylinder I were not thus inclosed. This outer cylinder has an inwardly-projecting flange at the top, and rests upon the outward-projecting flange *n* of the cap H, and the lower end of this cylinder rests against the outwardly-projecting flange *m* around the bottom of the cylinder I.

In practice, the pressure of steam in the boiler being required to be kept at a uniform height, the weights on the lever are so balanced that an excess of such pressure, acting upon the valve in the chamber *a*, will cause its stem to raise the longer arm of the lever, allowing the steam to pass the valve and enter the hollow piston through the ports *b*, and out of the same through the ports *i* into the chamber *k*, exerting its pressure upon the cap H, thereby raising the cylinder I with its outer cylinder, L, and slacking upon the chain M, which passes over the pulleys N to the crank-shaft O of the damper P in the smoke-stack R. The greater the pressure of steam the higher within its limit will the cylinders be forced up until the damper is entirely closed, thereby checking the fire in the furnace until the steam is reduced to the proper pressure. When this is attained the weight of the cylinders will overcome the friction between the hollow piston and the cylinder I, the valve closes, and the cylinders descend to their original position, the damper opening gradually as the cylinders fall. The steam left in the cylinder I will gradually condense, and the water of condensation will pass out between the bottom of the cylinder and piston by its own gravity. Although described as acting upon the damper in a smoke-flue, it may be employed with suitable connections to act upon the door in the ash-pit of the furnace to keep the pressure of steam within the given limit.

I make no broad claim to a damper-regulator having a valve and valve-chamber located in such a manner that steam will flow upwardly past the valve, and a valve-lever for regulating the load on the valve, and steam-ports located in the valve-lever support, as my invention consists in certain features of construction and arrangement of parts specified in the claims.

What I claim as my invention is—

1. In a damper-regulator, a steam cylinder and piston, one of which is connected with the damper and has a relative motion with respect to the other, said cylinder and piston located at the top of an upright steam-conducting stem, in combination with a valve located in a valve-chamber in said stem, a weighted lever passed through said stem and bearing upon the valve, and a steam port or ports leading upward through the stem at the sides of the lever to the cylinder and piston, substantially as set forth.

2. In a damper-regulator, the combination, with a valve-chamber and valve located therein, the construction being such that when the valve is raised steam flows to the valve-actuating mechanism, of a valve-lever for regulating the load on the valve and a steam port or passage located in the solid end of the hollow piston and on the side of the valve-lever, and forming a steam-conduit between the upper portion of the valve-chamber and the chamber of the damper-actuating mechanism, substantially as set forth.

3. In a damper-regulator, the combination, with an outer cylinder and inner hollow piston, of a guide-rod connected with the outer cylinder, and extending downwardly into said piston and guided within the upper end thereof, substantially as set forth.

4. In a damper-regulating device, a pipe communicating with a steam-generator, and provided with a valve and hollow piston, A, having ports *b*, affording communication for the steam to pass into the hollow piston A, the movement of said valve being controlled by the weighted lever E, substantially as described.

5. In combination with a damper-regulating device, the hollow piston A, into which steam is admitted, as described, and with a cylinder, I, and cap H, chamber *k*, the ports *i*, through which steam is admitted from the hollow piston into the chamber *k*, substantially as and for the purposes set forth.

6. In combination with a damper-regulating device, the cap H of the cylinder I, the guide-rod K passing through the tube-extension G of the cap F of the hollow piston A, as described.

7. In a damper-regulating device, the outer cylinder, L, in combination with the cylinder I and its cap H and the hollow piston A, substantially as and for the purposes set forth.

8. A damper-regulating device consisting of the hollow piston A, pipe B, chamber *a*, inclosing a valve, C, the ports *b*, the ring D, provided with lugs or ears *c*, the lever E, fulcrumed thereto, the cap F, tubular extension G, cylinder I, chamber *k*, ports *i*, guide-rod K, and incasing-cylinder L, the parts being constructed, arranged, and operating substantially as described.

DANIEL C. KELLEM.

Witnesses:

WILLIAM PORTER,

S. E. THOMAS.